(12) United States Patent
Sakurada

(10) Patent No.: US 11,537,143 B2
(45) Date of Patent: Dec. 27, 2022

(54) CONTROLLER AND AUTONOMOUS DRIVING VEHICLE

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 16/711,848

(22) Filed: Dec. 12, 2019

(65) Prior Publication Data

US 2020/0264630 A1 Aug. 20, 2020

(30) Foreign Application Priority Data

Feb. 18, 2019 (JP) .............................. JP2019-026864

(51) Int. Cl.
*G05D 1/02* (2020.01)
*G05D 1/00* (2006.01)
*H04B 17/318* (2015.01)
*H04W 4/40* (2018.01)

(52) U.S. Cl.
CPC ......... *G05D 1/0278* (2013.01); *G05D 1/0022* (2013.01); *G05D 1/0077* (2013.01); *G05D 1/0223* (2013.01); *H04B 17/318* (2015.01); *H04W 4/40* (2018.02)

(58) Field of Classification Search
CPC .. G05D 1/0278; G05D 1/0022; G05D 1/0077; G05D 1/0223; H04B 17/318; H04W 4/40
See application file for complete search history.

(56) References Cited

U.S. PATENT DOCUMENTS

| 7,907,063 | B2* | 3/2011 | Simon | G08G 1/096783 340/905 |
| 10,282,625 | B1* | 5/2019 | Wengreen | B60K 35/00 |
| 2011/0189943 | A1* | 8/2011 | Ilarregui | H04B 7/15592 455/7 |
| 2018/0026705 | A1* | 1/2018 | Parks | H04B 7/18506 701/2 |
| 2018/0244275 | A1* | 8/2018 | Bremkens | B60W 50/14 |
| 2019/0064833 | A1* | 2/2019 | Nance | B60W 30/14 |
| 2021/0005079 | A1* | 1/2021 | Yang | G08C 17/02 |

FOREIGN PATENT DOCUMENTS

| JP | 2014-106854 A | 6/2014 |
| JP | 2016-192028 A | 11/2016 |

* cited by examiner

*Primary Examiner* — Faris S Almatrahi
*Assistant Examiner* — Sahar Motazedi
(74) *Attorney, Agent, or Firm* — Oliff PLC

(57) ABSTRACT

A controller for transmitting control information necessary for autonomous driving to an autonomous driving vehicle is provided. The controller includes: a reception device configured to receive a signal transmitted from a wireless communication device included in the autonomous driving vehicle; a first transmission device configured to transmit first control information to the wireless communication device included in the autonomous driving vehicle; and a second transmission device configured to transmit information to a satellite based on a reception condition of the signal from the autonomous driving vehicle received by the reception device, the information being used by the satellite to transmit second control information to a satellite communication device included in the autonomous driving vehicle.

6 Claims, 3 Drawing Sheets

CONTROLLER AND AUTONOMOUS DRIVING VEHICLE

INCORPORATION BY REFERENCE

The disclosure of Japanese Patent Application No. 2019-026864 filed on Feb. 18, 2019 including the specification, drawings and abstract is incorporated herein by reference in its entirety.

BACKGROUND

1. Technical Field

The present disclosure relates to a controller and an autonomous driving vehicle.

2. Description of Related Art

In recent years, there has been known an autonomous driving vehicle that can recognize the surrounding environment using a radar or the like and can travel autonomously even when a human driver does not perform all the driving operations. A technology is demanded for the autonomous driving vehicle to travel safely even when communication failure or the like occurs due to failure in some of the devices.

Japanese Patent Application Publication No. 2016-192028 (JP 2016-192028 A) discloses an automated driving control system. When some part of location estimation information is not available, the automated driving control system determines, based on the acquired remaining part of the location estimation information, whether or not autonomous driving is possible.

Japanese Patent Application Publication No. 2014-106854 (JP 2014-106854 A) discloses an autonomous driving vehicle control device configured to provide a notification to prompt a driver to cancel autonomous driving, when a detection accuracy of detection means for acquiring a travel state of a vehicle or the like, does not satisfy a criterion.

SUMMARY

However, it is a great burden for a driver to stop an autonomous driving vehicle or to be prompted to cancel autonomous driving, whenever the information necessary for autonomous driving becomes unavailable due to communication failure or the like, as in the autonomous driving vehicle control devices disclosed in JP 2016-192028 A and JP 2014-106854.

The inventors of this application focus on the point that the communication failure or the like may occur, even without failure in the devices mounted on the autonomous driving vehicle. The communication failure can occur when an autonomous driving vehicle travels in areas, such as mountainous areas and desert areas, where communication facilities for transmitting to the autonomous driving vehicle control information necessary for traveling are not installed. However, there are high demands for traveling in an autonomous driving mode that does not require sensitive driving operation, particularly in such desert areas or the like. Even in urban areas, there are spots where radio wave conditions are locally poor. It is not necessarily desirable to force the driver to cancel autonomous driving or other operation, whenever the vehicle travels in such areas.

Accordingly, it is an object of the present disclosure to provide an autonomous driving vehicle and a controller that allow continuous autonomous driving even when a communication failure or the like occurs.

The present disclosure relates to a controller for transmitting control information necessary for autonomous driving to an autonomous driving vehicle. The controller includes a reception device, a first transmission device, and a second transmission device. The reception device is configured to receive a signal transmitted from a wireless communication device included in the autonomous driving vehicle. The first transmission device is configured to transmit first control information to the wireless communication device included in the autonomous driving vehicle. The second transmission device is configured to transmit information to a satellite based on a reception condition of the signal from the autonomous driving vehicle received by the reception device, the information being used by the satellite to transmit second control information to a satellite communication device included in the autonomous driving vehicle.

The controller can transmit necessary control information in accordance with the reception condition of the signal from the autonomous driving vehicle through satellite communication.

The second transmission device may be configured to transmit the information used by the satellite to transmit the second control information based on, as the reception condition, interruption of the signal from the autonomous driving vehicle received by the reception device. The first transmission device may be configured to transmit, as the first control information, first speed limit information for limiting speed of the autonomous driving vehicle. The second transmission device may be configured to transmit, as the second control information, second speed limit information for limiting the speed of the autonomous driving vehicle, the second speed limit information being smaller in data volume than the first speed limit information. The reception condition from the autonomous driving vehicle may include, in addition to the interruption of the signal, reception of an urgent signal indicating abnormality from the autonomous driving vehicle, and reception of a signal generated in abnormal situations.

The present disclosure relates to a controller for transmitting control information necessary for autonomous driving to an autonomous driving vehicle. The controller includes a reception device, a first transmission device, and a second transmission device. The reception device is configured to receive a signal transmitted from a wireless communication device included in the autonomous driving vehicle. The first transmission device is configured to transmit first control information to the wireless communication device included in the autonomous driving vehicle. The second transmission device is configured to transmit information to another vehicle based on a reception condition of the signal from the autonomous driving vehicle received by the reception device, the information being used by the other vehicle to transmit second control information to a vehicle-to-vehicle communication device included in the autonomous driving vehicle.

The present disclosure also relates to an autonomous driving vehicle including a transmission device, a reception device, and satellite communication device. The transmission device is configured to transmit a signal to a controller. The reception device is configured to receive first control information from the controller. The satellite communication device is configured to receive second control information from a satellite based on a transmission condition of the signal transmitted to the controller with use of the transmission device.

The satellite communication device may be configured to receive the second control information based on failure of transmission of the signal to the controller with use of the transmission device. The reception device may be configured to receive, as the first control information, first speed limit information for limiting speed of the autonomous driving vehicle. The satellite communication device may be configured to receive, as the second control information, second speed limit information for limiting the speed of the autonomous driving vehicle, the second speed limit information being smaller in data volume than the first speed limit information. The autonomous driving vehicle may further include a control device configured to generate the second control information based on the first control information.

The wireless communication device may be a communication device in conformity with the standard for a fifth-generation Wi-Fi that is the standard for a wireless LAN.

Such an autonomous driving vehicle incorporates the wireless communication device, and another communication device, such as a communication device through satellite connection. Accordingly, when communication with the wireless communication device does not succeed, the second communication device can be selected to acquire at least some of the information necessary for autonomous driving.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described hereinbelow with reference to the drawings. The following embodiments are only illustrative for explanation of the present disclosure and are not intended to limit the present disclosure only to the embodiments.

Figure 1:
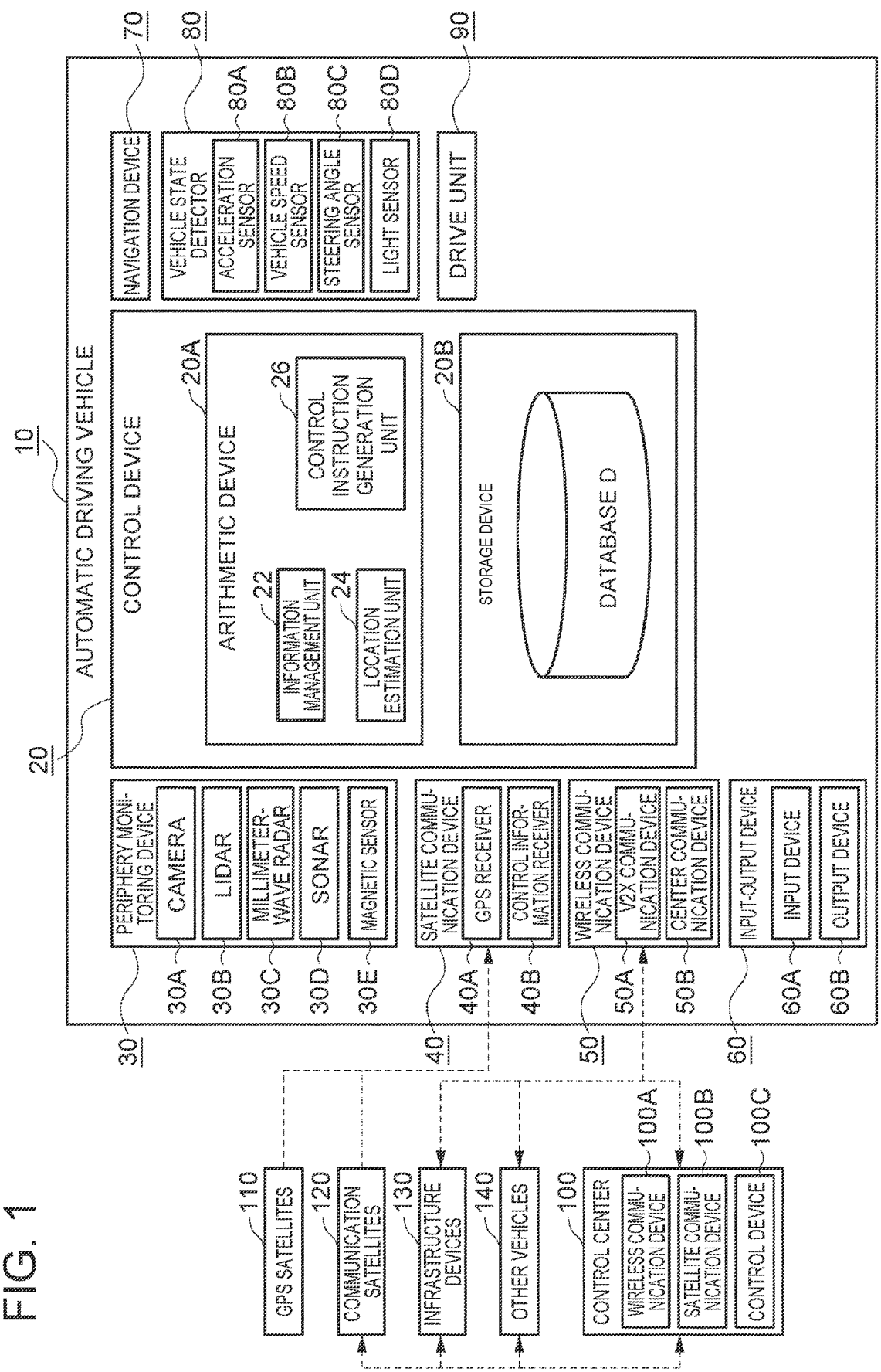
FIG. 1 is a block diagram of a driving system including an autonomous driving vehicle 10.

As shown in FIG. 1, an autonomous driving vehicle 10 includes a control device 20, a periphery monitoring device 30, a satellite communication device 40, a wireless communication device 50, an input-output device 60, a navigation device 70, a vehicle state detector 80, and a drive unit 90 for autonomous driving.

The control device 20 connects with each of the autonomous driving vehicle 10, including the periphery monitoring device 30 to the drive unit 90, through an unillustrated internal bus or the like so as to control each of these devices. The control device 20 also receives prescribed signals from the respective devices connected to the control device 20, and generates and outputs control instructions for driving each of the devices based on the received signals. The control device 20 includes an arithmetic device 20A and a storage device 20B. When the arithmetic device 20A executes computer programs recorded on the storage device 20B, various arithmetic processes that are executed by the autonomous driving vehicle 10 in the present disclosure are executed.

The arithmetic device 20A executes prescribed arithmetic processes in accordance with computer programs, such as a firmware stored in the storage device 20B. The arithmetic device 20A may be configured with one or more central processing units (CPU), micro processing units (MPU), GPUs, microprocessors, processor cores, multiprocessors, application-specific integrated circuits (ASICs), field programmable gate arrays (FPGAs), and the like.

The storage device 20B includes a nonvolatile memory such as an MRAM, a NAND flash memory, and a NOR flash memory, or a nonvolatile memory such as an SSD or a hard disk drive. The storage device 20B also includes a volatile memory, such as a SRAM or a DRAM. The nonvolatile memory includes a database D that stores computer programs, map information, and various data necessary in the present disclosure. The computer programs are used for executing various arithmetic processes shown in the flowcharts, and the like, of the present disclosure. The map information includes a dynamic map that is high-accuracy map information dynamically generated as digital map information. In the digital map information, static basic map information indicating road alignments, or the like, is integrated with dynamic environment information regarding real-time dynamic information on road conditions, accident occurrence points, vehicle locations, and pedestrian locations on the roads. The nonvolatile memory corresponds to a non-transitory physical medium. The volatile memory provides work areas for temporarily storing computer programs loaded from the nonvolatile memory, or various data generated while the arithmetic device 20A executes the computer programs. In the nonvolatile memory, computer programs and data received by the communication device 50 from the outside may be stored.

The control device 20 functionally includes an information management unit 22, a location estimation unit 24, and a control instruction generation unit 26. The information management unit 22 collects information necessary for autonomous driving from the periphery monitoring device 30, the satellite communication device 40, the wireless communication device 50, the vehicle state detector 80, and the like, and supplies the collected information to the location estimation unit 24 and the control instruction generation unit 26. Based on the dynamic map stored in the storage device 20B and the location estimation information collected by the information management unit 22, the location estimation unit 24 acquires an absolute location of the autonomous driving vehicle 10 as absolute coordinates of latitude and longitude, and acquires relative coordinates of the autonomous driving vehicle 10 with respect to a surrounding object of the autonomous driving vehicle 10. When an occupant instructs autonomous driving, the control instruction generation unit 26 generates a control instruction for driving the autonomous driving vehicle 10 in accordance with the dynamic map stored in the storage device 20B, the location information on the autonomous driving vehicle 10 acquired from the location estimation unit 24, the travel state information on the autonomous driving vehicle 10 collected by the information management unit 22, and the control information received from a control center 100. The control instruction generation unit 26 outputs the generated control instruction to the drive unit 90. During autonomous driving control, the control instruction generation unit 26 acquires a current location of the autonomous driving vehicle 10 from the location estimation unit 24, and performs control so as to maintain the location of the autonomous driving vehicle 10 on a prescribed route. Furthermore, in order to recognize an obstacle or the like, based on the peripheral condition of the autonomous driving vehicle 10 detected by the periphery monitoring device 30, and to avoid contact with the obstacle, the control instruction generation unit 26 generates control instructions for performing deceleration, stop, steering, or the like, of the autonomous driving vehicle 10, and supplies the generated instructions to the drive unit 90. The autonomous driving vehicle 10 is configured to be able to stop autonomous driving based on operation of an occupant with the input-output device 60, and to travel based on operation of a driver, such as steering wheel operation, accelerator pedal operation, and brake pedal operation. In that case, the control device 20 generates a control instruction for driving the autonomous driving vehicle 10 based on the steering operation or the like, of the driver, and supplies the control instruction to the drive unit 90.

The periphery monitoring device 30 includes sensors, such as a camera 30A, a laser detection and ranging (LIDAR) 30B, a millimeter-wave radar 30C, a sonar 30D, and a magnetic sensor 30E. With use of these sensors, the periphery monitoring device 30 detects peripheral environment, such as objects including vehicles, persons, and obstacles around the autonomous driving vehicle 10, a distance to the objects, a direction of the objects, and lane markings and a road surface state of the road where the autonomous driving vehicle 10 travels, and supplies the peripheral environment to the control device 20.

The satellite communication device 40 includes a GPS receiver 40A and a control information receiver 40B. The GPS receiver 40A receives positioning signals from GPS satellites 110, and supplies the signals to the control device 20 as location information on the autonomous driving vehicle 10. The location estimation unit 24 of the control device 20 acquires the current location on the autonomous driving vehicle 10 based on the received positioning signals.

The control information receiver 40B can receive control information necessary to control the autonomous driving vehicle 10 from a communication satellite 120. For example, the control information receiver 40B can receive control instructions for controlling actuators of an accelerator, a brake, and a steering wheel in the drive unit 90 from the communication satellite 120. The communication satellite 120 may be used to provide satellite telephone service. For example, the communication satellite 120 may be a plurality of low-altitude earth-orbit satellites. The control information receiver 40B can receive control information at a speed of 128 k bps, for example. As described later, data transmission speed using the control information receiver 40B is smaller than data transmission speed using the wireless communication device 50. For example, the data transmission speed is 1/100 or less the speed using the wireless communication device 50.

The wireless communication device 50 includes a vehicle to X (V2X) communication device 50A and a center communication device 50B. Specifically, the V2X communication device 50A includes a communication device in conformity with a telecommunications standard such as 802.11ac defined by IEEE to perform a vehicle to cellular network (V2N) communication, a vehicle to vehicle (V2V) communication, a vehicle to road side infrastructure (V2I) communication, and a vehicle to pedestrian (V2P) communication. The communication speed of the communication device is equal to or greater than 500 Mbps, for example. The center communication device 50B includes a communication device for communicating with the control center 100. Therefore, the autonomous driving vehicle 10 can perform high speed communication with each of a plurality of infrastructure devices 130 installed in traffic signals or embedded under the road surface, a plurality of other vehicles 140, and the control center 100.

The input-output device 60 includes an input device 60A, such as a touch panel, a microphone, and a mechanical switch for the driver or the like to input information into the autonomous driving vehicle 10, and voice recognition processing software. The input-output device 60 is configured such that information necessary to control the autonomous driving vehicle 10 can be input based on driver's operation to press the touch panel or driver's utterance. The input-output device 60 also includes an output device 60B, such as a liquid crystal display, an HUD, or other displays for outputting image information, and one or more speakers for outputting speech information.

The navigation device 70 calculates and guides a route to a prescribed destination based on the input from the driver or the like. The navigation device 70 may include an unillustrated nonvolatile memory. The navigation device 70 may store map data in the nonvolatile memory, may acquire map data stored in the storage device 20B, or may acquire map data from the wireless communication device 50. The map data includes information on road types, and information regarding road signs, traffic signals, and the like. The map data also includes facility information, address information, and location information regarding specific points called nodes that include intersections of the roads. The map data also includes information corresponding to so-called links that are roads connecting the nodes. The location information is indicated by latitude, longitude, and altitude, for example. Although a processor for route calculation may be mounted on the navigation device 70, the arithmetic device 20A may execute the route calculation. The navigation device 70 may include a wireless communication device for receiving GPS signals. The navigation device 70 may be configured with an information processing terminal possessed by the driver or the like. In this case, the information processing terminal and the autonomous driving vehicle 10 may be connected to, for example, a Bluetooth® device or the like included in the wireless communication device 50. The route guidance information for guiding a route or the like may be output from the output device 60B of the autonomous driving vehicle 10.

The vehicle state detector 80 includes an acceleration sensor 80A, a vehicle speed sensor 80B, a steering angle sensor 80C, and a light sensor 80D. The vehicle state detector 80 detects the travel state of the autonomous driving vehicle 10 with use of these sensors, and supplies the travel state to the control device 20.

The drive unit 90 includes motors and other actuators for operating the engine, the brake, and the steering wheel of the autonomous driving vehicle 10. The drive unit 90 operates based on a control instruction received from the control device 20. As described above, the autonomous driving vehicle 10 is configured to be able to stop autonomous driving and to output to the drive unit 90 or other devices control instructions generated by the control device 20 based on operation of such units as an accelerator pedal, a brake pedal, and the steering wheel operated by the driver or the like. The autonomous driving vehicle 10 may be an electric vehicle including a battery and an electric motor.

The control center 100 is a controller that controls autonomous driving of the autonomous driving vehicle 10 and other vehicles 140 that are other autonomous driving vehicles in a specific area. The control center 100 includes a wireless communication device 100A, a satellite communication device 100B, and a control device 100C. The hardware configuration of the control device 100C is similar to that of the control device 20. The control device 100C includes an arithmetic device and a storage device. In the storage device, computer programs, dynamic maps, location information on each vehicle, and identification information on the vehicles are recorded in association with each other. The arithmetic device executes each of the arithmetic processes shown in the present disclosure by executing the computer programs recorded on the storage device. The control device 100C can communicate with the autonomous driving vehicle 10, the other vehicles 140 that are a plurality of other autonomous driving vehicles, and a plurality of other infrastructure devices 130 with use of the wireless communication device 100A.

The control device 100C of the control center 100 can receive a current location, a destination, the number of occupants, vehicle identification information, and the like, from the autonomous driving vehicle 10, and the other vehicles 140. Based on these pieces of information, the control device 100C can generate a route including a lane plan from the current location to the destination, and transmit the generated route to each of the vehicles as control information. The control device 100C can further transmit speed limit information in a specific area covered by the control center 100 and other control information necessary for autonomous driving to the autonomous driving vehicle 10 and the other vehicles 140. The wireless communication device 50 of the autonomous driving vehicle 10 receives these pieces of control information from the control center 100, and supplies the information to the control device 20. The control device 20 generates a control instruction based on the received control information, and outputs the instruction to the drive unit 90. For example, the control device 20 generates a control instruction, and outputs the instruction to the drive unit 90 such that the autonomous driving vehicle 10 travels without exceeding the speed limit based on the speed limit information received from the control center 100 and along a route in accordance with the route information received from the control center 100. When autonomous driving is not performed, the driver can determine a route for reaching the destination and receive a guidance for the determined route with use of the navigation device 70.

The control center 100 further includes the satellite communication device 100B. Through the satellite communication device 100B, the control device 100C is configured to be able to transmit to the autonomous driving vehicle 10 or the other vehicles 140 control information and identification information for identifying the target vehicle. When receiving the control information and the vehicle identification information from the control center 100, the communication satellite 120 transmits the received control information and identification information to the specific area covered by the control center 100. Accordingly, the autonomous driving vehicle 10 or the other vehicles 140 can receive the control information for their own vehicles from the communication satellite 120.

Here, since the satellite communication is lower in speed than general wireless communication, the control device 100C can transmit to the communication satellite 120 a control instruction with a small data volume that is generated in the control instruction generation unit as control information. Specifically, the control instruction generation unit of the control device 100C can generate, based on the control information with a large data volume that is essentially transmitted to the wireless communication device 50, a control instruction with a small data volume that is received by the drive unit 90. The control instruction generation unit can transmit, with the identification information for the target vehicle, the control instruction with a small data volume to the communication satellite 120. With this configuration, the control information necessary for autonomous driving can be transmitted to the autonomous driving vehicle 10 or the other vehicles 140 even with use of a low-speed satellite communication.

When the control information with a small data volume is generated, the control device 100C may be configured to transmit only the control information with high importance, such as speed limit information, to the communication satellite 120, and to discard the control information with low importance.

Figure 2:
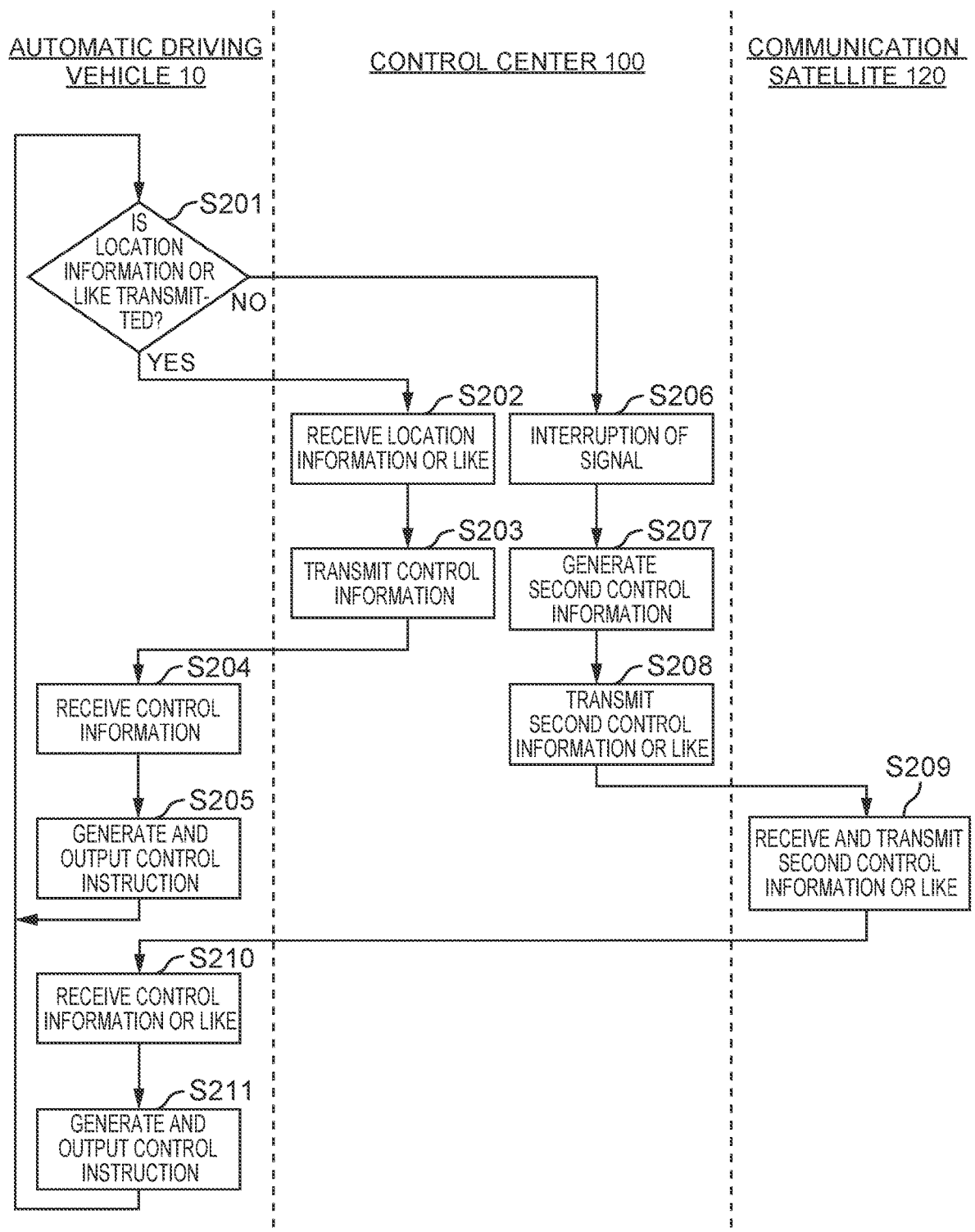
FIG. 2 is a flowchart showing a method of providing control information with use of a communication satellite 120.

FIG. 2 is a flowchart showing processes executed by the autonomous driving vehicle 10 and the control center 100 according to the present embodiment.

As described above, the autonomous driving vehicle 10 is configured to periodically output information such as the location information on its own to the control center 100, and receive from the control center 100 the control information based on the output information. However, when the wireless communication device 50, or the like, of the autonomous driving vehicle 10 fails, when the autonomous driving vehicle 10 travels in areas not equipped with communication devices, such as mountainous areas, and desert areas, even without occurrence of failure of the devices, and when the autonomous driving vehicle 10 travels in urban areas including spots locally poor in radio wave condition, the autonomous driving vehicle 10 becomes unable to transmit the location information or other information.

Accordingly, as shown in FIG. 2, the control device 20 of the autonomous driving vehicle 10 determines whether the autonomous driving vehicle 10 can transmit location information (step S201). For example, when the autonomous driving vehicle 10 transmits location information on the own vehicle or the like, and the control device 20 receives an acknowledgement signal acknowledging reception of the information from the control center 100, the autonomous driving vehicle 10 can confirm that transmission of the location information or the like is successful (Y). The information transmitted by the autonomous driving vehicle 10 is not limited to the location information or the like. Examples of the information transmitted by the autonomous driving vehicle 10 may include any information scheduled to be transmitted to the control center 100, such as information indicating a destination input by an occupant, or the like, of the autonomous driving vehicle 10. Hereinafter, the information scheduled to be transmitted to the control center 100 is simply called location information or the like.

When the autonomous driving vehicle 10 successfully transmits location information or the like, the wireless communication device 100A of the control center 100 receives the location information or the like on the autonomous driving vehicle 10 (step S202). The control device 100C of the control center 100 then generates a control information for controlling the autonomous driving vehicle 10 based on the location information or the like received from the autonomous driving vehicle 10, and transmits the information to the autonomous driving vehicle 10 (step S203). Examples of the control information include control information for decelerating, stopping, and steering the autonomous driving vehicle 10, based on the route information on the route for the autonomous driving vehicle 10 to take, the speed limit information in the specific area, and the dynamic map.

Upon reception of these pieces of control information from the control center 100 (step S204), the control device 20 of the autonomous driving vehicle 10 generates a control instruction based on these pieces of control information, the dynamic map recorded on its storage device 20B, the peripheral environment information collected from the periphery monitoring device 30, the vehicle state of the autonomous driving vehicle 10 obtained from the vehicle state detector 80, the information collected from the infrastructure devices 130 or the other vehicles 140 with use of the wireless communication device 50, or the like. The control device 20 of the autonomous driving vehicle 10 then outputs the generated control instruction to the drive unit 90. The drive unit 90 drives the actuators for the engine, the motors, the brake, and the like, based on the received control instruction.

In step S201, the control center 100 determines interruption of the signal from the autonomous driving vehicle 10 (step S206), when the autonomous driving vehicle 10 fails to transmit location information or the like, when the autonomous driving vehicle 10 transmits the location information or the like but fails to receive the acknowledgement signal or the like that indicates reception from the control center 100, or when the autonomous driving vehicle 10 does not transmit the location information or the like that the control center 100 can receive. The control center 100 can determine interruption of the signal based on, for example, transmission of the location information or the like that is to be transmitted from the autonomous driving vehicle 10 not being transmitted for a prescribed time.

When the control center 100 determines interruption of the signal from the autonomous driving vehicle 10, the control center 100 generates second control information that is different from the control information generated in step S203. The second control information is control information smaller in data volume than the control information generated in step S203. Specifically, the control device 100C of the control center 100 generates, as the second control information, a control instruction that is received by the drive unit 90, the control instruction being generated in step S205 by the control device 20 of the autonomous driving vehicle 10 based on the control information generated in step S203 (step S207). For example, when the control information includes speed limit information, the speed limit information itself is transmitted in step S203. The control instruction received by the autonomous driving vehicle 10 is the control instruction for controlling the engine or the brake based on the vehicle speed or the like detected by the vehicle speed sensor 80B of the vehicle state detector 80 in the autonomous driving vehicle 10. The information generated in step S207 and transmitted in step S208 by the control device 100C of the control center 100 is a control instruction for controlling the engine or the brake instead of the speed limit information itself. Here, the control center 100 can generate a control instruction for the autonomous driving vehicle 10 based on the information received from the other vehicles 140, the infrastructure devices 130, or the like, so as to generate a high-precision control instruction. For example, the control device 100C of the control center 100 estimates the vehicle speed of the autonomous driving vehicle 10 based on a change in location information or the like received from the other vehicles 140 around the autonomous driving vehicle 10. The control device 100C of the control center 100 may similarly estimate the vehicle speed and other information on the autonomous driving vehicle 10 based on the information from the infrastructure devices 130 around the autonomous driving vehicle 10. For example, the control device 100C of the control center 100 may estimate the vehicle speed of the autonomous driving vehicle 10 based on video images of the autonomous driving vehicle 10 imaged by the infrastructure devices 130 (or the other vehicles 140). The control device 100C of the control center 100 may estimate the vehicle speed from a change in location information or the like on the autonomous driving vehicle 10 received till then. When there is no information sufficient enough to estimate the vehicle speed of the autonomous driving vehicle 10, the control device 100C of the control center 100 may generate a control instruction for simply shifting to a constant speed low enough to observe the speed limit, and may transmit the control instruction to the communication satellite 120 as the second control information.

The satellite communication device 100B of the control center 100 transmits a control instruction, generated as the second control information or the like as described before, and identification information on the autonomous driving vehicle 10 to the communication satellite 120 (step S208). At that time, an appropriate communication satellite 120 is selected for supplying satellite information to the specific area covered by the control center 100.

When receiving the second control information, the communication satellite 120 transmits the received second control information to a specific area (step S209). In step S201, when the autonomous driving vehicle 10 fails to transmit the location information or the like that the control center 100 can receive, the autonomous driving vehicle 10 is configured to be controlled with use of the second control information received from the satellite communication device 40. The satellite communication device 40 of the autonomous driving vehicle 10 receives the second control information (step S210). Based on the second control information, the control device 20 generates a control instruction, and supplies the control instruction to the drive unit 90 (step S211). At least some of the signals supplied to the drive unit 90 may be the control instruction itself that is included in the second control information.

The autonomous driving vehicle described in the foregoing can acquire necessary control information using satellite communication, even when communication failure or the like occurs. This makes it possible to continue autonomous driving for a longer time. Particularly, the autonomous driving vehicle is configured to determine whether the location information or the like transmitted to the controller by itself fails. Accordingly, even when transmission of the location information or the like to the controller fails for reasons other than the failure of the communication device, it becomes possible to acquire necessary control information using satellite communication, and to continue autonomous driving. Since the controller can generate control information based on the interruption of the signal from the autonomous driving vehicle and can control the autonomous driving vehicle to receive the control information, it becomes possible to continue autonomous driving for a longer time. Particularly, when the signal interruption occurs, the second control information with a small data volume is generated. This allows the communication satellite to transmit minimum control information required for continuation of autonomous driving to the autonomous driving vehicle.

Second Embodiment

A second embodiment of the present disclosure will be described below. The second embodiment is different from the first embodiment in that the information necessary for autonomous driving of the own vehicle is acquired from another vehicle using vehicle-to-vehicle communication.

Since the autonomous driving vehicle according to the second embodiment has the same hardware configuration as the autonomous driving vehicle 10 according to the first embodiment, the description thereof is omitted. In addition, description of a portion where a person skilled in the art can understand in the same way as in the first embodiment is omitted or simplified.

Figure 3:
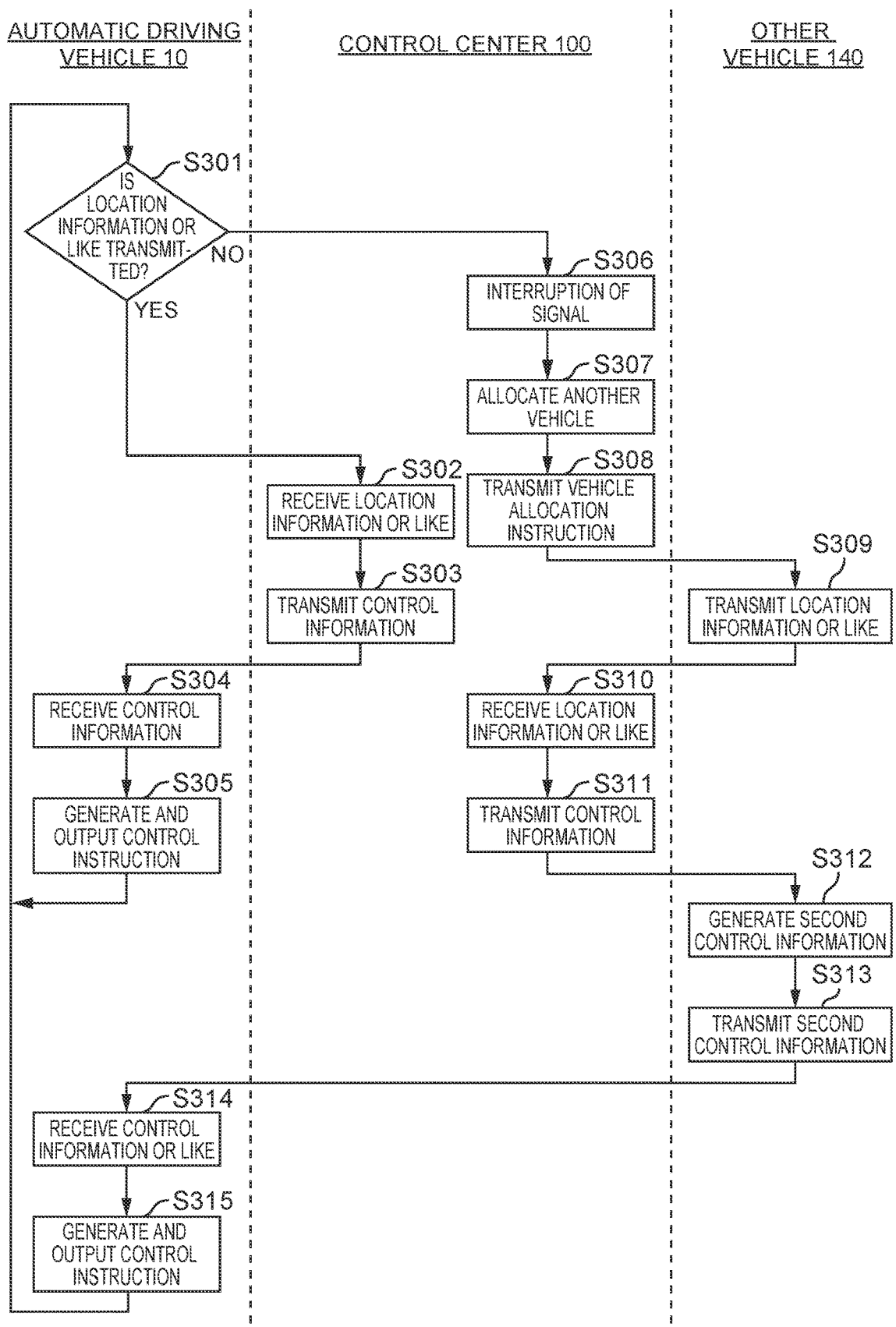
FIG. 3 is a flowchart showing a method of providing control information with use of another vehicle 140.

FIG. 3 is a flowchart showing a method of providing control information with use of another vehicle 140 according to the second embodiment. Since each of steps S301 to S305 is equivalent to steps S201 to S205, the description thereof is omitted.

In step S306, when a signal from the autonomous driving vehicle 10 is interrupted, the control center 100 allocates the other vehicle 140 around the autonomous driving vehicle 10 (step S307). Since the other vehicle 140 has the same configuration as the autonomous driving vehicle 10, like component members are denoted by like reference numerals to omit a detailed description thereof. However, the other vehicle 140 may be other than the autonomous driving vehicle as long as vehicle-to-vehicle communication is supported.

The other vehicle 140 that receives a vehicle allocation instruction (step S308) from the control center 100 acquires estimated location information on the autonomous driving vehicle 10 from the control center 100, and approaches a location where vehicle-to-vehicle communication with the autonomous driving vehicle 10 is possible. The location of the autonomous driving vehicle 10 can be estimated based on the route information transmitted to the autonomous driving vehicle 10 by the control center 100, the location information on the autonomous driving vehicle 10 before signal interruption, the information acquired from the infrastructure device 130, and the like.

The other vehicle 140 transmits its own location information or the like to the control center 100 (step S309). The control center 100 generates a control information based on the location information or the like received from the other vehicle 140, and transmits the generated control information to the other vehicle 140 (steps S310 to S311).

The control device 20 of the other vehicle 140 generates second control information based on the control information received from the control center 100 (step S312). The second control information is a control instruction that can be transmitted to the drive unit 90. The control device 20 of the other vehicle 140 transmits the generated control instruction to the autonomous driving vehicle 10 using the V2X communication device 50A for vehicle-to-vehicle communication (step S313). When receiving the second control information including the control instruction from the other vehicle 140 (step S314), the V2X communication device 50A of the autonomous driving vehicle 10 outputs the information to the own drive unit 90 (step S315).

The autonomous driving vehicle as described in the forgoing can acquire control information necessary for autonomous driving from another vehicle even when communication with the controller fails. For example, even in the case where a wireless communication infrastructure goes down due to a large-scale disaster or the like, it becomes possible to continue autonomous driving within a possible range through the vehicle-to-vehicle communication network When the vehicle-to-vehicle communication is secured at sufficient communication speed, the other vehicle may transfer the control information received from the control center to the autonomous driving vehicle.

Various deformations of the present disclosure are possible without departing from the scope of the present disclosure. For example, some component members of a certain embodiment may be added to other embodiments within the range of general creativity of a person skilled in the art. Some component members in a certain embodiment may also be replaced with the corresponding component members in other embodiments.

What is claimed is:

1. A controller for transmitting control information necessary for autonomous driving to an autonomous driving vehicle, comprising:
 a receiver configured to receive a signal transmitted from a wireless communication device of the autonomous driving vehicle;
 a first transmitter configured to transmit, when the signal is not interrupted, first control information to the wireless communication device of the autonomous driving vehicle, the first control information including a speed limit; and
 a second transmitter configured to transmit, when the signal is interrupted, information to a satellite that is used by the satellite to transmit second control information configured to control a component of the autonomous driving vehicle to limit speed of the autonomous driving vehicle, from the satellite directly to a satellite receiver of the autonomous driving vehicle, the second control information not including the speed limit and being smaller in data volume than the first control information.

2. The controller according to claim 1, wherein:
 the first control information is generated based on the signal from the autonomous driving vehicle received by the receiver; and
 the second control information is generated based on a signal from a vehicle other than the autonomous driving vehicle received by the receiver.

3. A controller for transmitting control information necessary for autonomous driving to an autonomous driving vehicle, comprising:
 a receiver configured to receive a signal transmitted from a wireless communication device of the autonomous driving vehicle;
 a first transmitter configured to transmit, when the signal is not interrupted, first control information to the wireless communication device of the autonomous driving vehicle, the first control information including a speed limit; and
 a second transmitter configured to transmit, when the signal is interrupted, information to another vehicle that is used by the other vehicle to transmit second control information configured to control a component of the autonomous driving vehicle to limit speed of the autonomous driving vehicle, to a vehicle-to-vehicle communication device of the autonomous driving vehicle, the second control information not including the speed limit and being smaller in data volume than the first control information.

4. An autonomous driving vehicle, comprising:
 a transmitter configured to transmit a signal to a controller;
 a receiver configured to receive first control information from the controller when the signal is not interrupted, the first control information including a speed limit; and a satellite receiver configured to receive second control information from a satellite when the signal is interrupted, the second control information being control instructions configured to control a component of the autonomous driving vehicle to limit speed of the autonomous driving vehicle, the second control information not including the speed limit and being smaller in data volume than the first control information.

5. The autonomous driving vehicle according to claim 4, wherein the satellite receiver receives the second control information based on failure of transmission of the signal to the controller with use of the transmitter.

6. The autonomous driving vehicle according to claim 4, further comprising a first controller configured to generate the second control information based on the first control information.

* * * * *